May 28, 1963  E. MINGANTI  3,091,157
KEY DUPLICATING MACHINE
Filed Feb. 2, 1961  2 Sheets-Sheet 1

INVENTOR
Ernesto Minganti

BY Abraham A. Saffitz
ATTORNEY

May 28, 1963  E. MINGANTI  3,091,157
KEY DUPLICATING MACHINE
Filed Feb. 2, 1961  2 Sheets-Sheet 2

INVENTOR
Ernesto Minganti
BY Abraham A. Saffitz
ATTORNEY

United States Patent Office 3,091,157
Patented May 28, 1963

3,091,157
KEY DUPLICATING MACHINE
Ernesto Minganti, Via S. Isaia 55/A
Bologna, Italy
Filed Feb. 2, 1961, Ser. No. 86,784
Claims priority, application Italy Feb. 4, 1960
1 Claim. (Cl. 90—13.05)

This invention relates generally to key duplicating machines and more particularly to a machine for automatically cutting keys duplicating a model key of the Yale type.

An important feature of this invention is a novel suspension system and mobile frame unit. Although suspension systems in this art are known, as for example those disclosed in Patent Nos. 1,565,047 and 2,148,668, these known systems do not mount the model key follower, the motor and the milling wheel for automatic movement both vertically to conform to the contour of the key and horizontially to the length of the ridges on the key with cutoff of the key duplicating operation. These prior devices also do not provide sufficient space for removing a key which has been cut and inserting another blank key to be cut and there is interference because of the position of the cutting tool.

An object of the invention is to provide a novel suspension system including mobile frame unit for the electrically motor driven milling or grinding wheel, said suspension system comprising lever and cam actuators in novel arrangement whereby automatic milling of a blank key to conform to the configuration of a master key of the Yale type is achieved, the only adjustment necessary being to line up the terminal notch of the master or model key with the corresponding notch of the blank key. To aid in this alignment, when the machine has completed the cutting of a key the suspension system causes the motor and the milling wheel to pivotally move away from the key to provide sufficient space for removing the cut key and inserting a blank key.

Other and further objects of the invention can be seen from the attached drawings, which represent a preferred embodiment of the invention, it being understood that various changes can be made apparent to those skilled in the art without departing in the spirit and the scope of the invention.

With more particular reference to the drawings a base frame 1 is provided having four vertical columns. A guide rail 2 extends between the upper ends of the columns on each side of the base.

Figure 7:
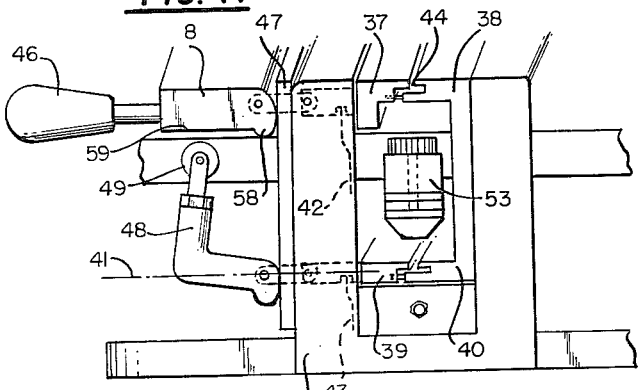
FIG. 7 is an enlarged view of the machine head.

At one end of the base frame 1 a head 36 is provided and which, as seen in FIG. 7, has vertically disposed clamping jaws 37, 38, 39 and 40. Jaws 38 and 40 are one piece and stationary while jaws 37 and 39, respectively, are movable toward and away from their corresponding jaws. The movable jaws have plates 37' and leaf springs 42 and 43 connected thereto and biasing the movable jaws to the right as viewed in FIG. 7 which is toward the closed position. Links 47 are connected to plates 37' and pass through a wall of the head.

A cam bar 8 is pivotally connected to the upper link 47 and has an operating handle 46 attached thereto whereby movement of handle 46 brings cam jaws 37 to open position through link 47 and plate 37' and against the action of spring 42.

When the model key is secured, therefore, any desired number of keys identical with the model can be cut without ever displacing the model key but merely by inserting and removing the keys to be cut from the upper clamp by operating the handle 46 to operate only the upper clamp.

An angled cam bar 48 is pivotally connected to the lower link 47 and a roller 49 is mounted at the upper end thereof. Thus, sufficient downward movement of handle 46 and cam bar 8 causes the latter to engage roller 49 and further movement will move jaw 39 to the open position.

An electric motor 5 is mounted on a movable base 4 forming part of the suspension system which will be discussed in detail below. A milling wheel 9 is connected to the motor shaft and overlies jaws 37 and 38 which are to clamp a blank key to be milled. A vertical plate 4' is connected to the rear portion of base 4 and a casing 12 is attached thereto.

Figure 4:
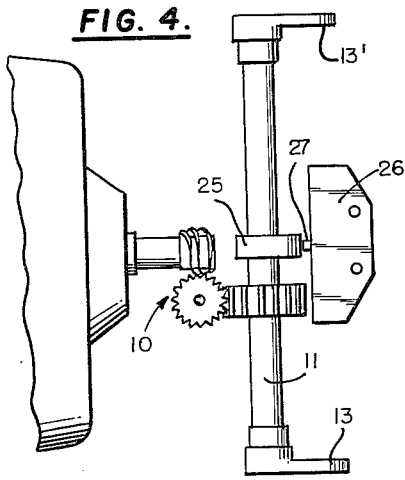
FIG. 4 is an enlarged fragmentary view of the motor and the mechanism for longitudinally driving the mobile frame, as well as the stopping mechanism.

The motor shaft on which milling wheel 9 is mounted projects from the rear of motor 5 and into casing 12. A shaft 11 having cranks 13, 13' on the ends thereof is rotatably mounted in the casing and is rotated by the motor shaft by gearing 10, as shown in FIG. 4.

Arms 15 and 16 pivotally connected to the upper ends of forward columns 1' at 17, 18 are in turn pivotally connected to cranks 13 at 14, 14'. So, as motor 5 turns cranks 13 also turn and through arms 15 and 16 the motor 5, base 4 and casing 12 are moved back and forth whereby the milling wheel 9 traverses the length of a blank key which is secured in upper jaws 37, 38 in the area designated as distance 28.

A switch housing 26 is attached to casing 12 and a switch actuator 27 projects therefrom. Cam 25 is secured on shaft 11 so that when the motor 5 has moved to one or the other extreme position of its horizontal movement, cam 25 engages switch actuator 27 and the electric circuit (not shown) controlling motor 5 is opened whereby movement of the milling wheel 9 ceases as does travel of motor 5.

A suspension system connects the base 4 to the base frame 1 and permits vertical and horizontal movement of base 4 with respect to the base frame 1. Since both sides of the suspension system are the same, it will be described with reference to only one side. This suspension includes an upstanding leg 7 on base 4 which is pivoted at 6 to the upper end of leg *a* of mobile frame 3. This frame has a forward leg 3*b* having a horizontal slide plate 3*c* which slides along guide rail 2.

A brace 3*d* is rigidly connected to the lower end of leg 3*a* and at its forward end is pivotally connected to a lower link 30 at 33. The forward end of base 4 is pivotally connected to an upper link 31 at 23 and links 30 and 31 are pivotally connected at 32 and at the end of cutting movement engage a support 35 slidably mounted in head 36.

The follower assembly 53 has a follower 54 provided with an angled model key contacting surface 55 which is adjustably mounted by means of screw 60. This assembly 53 is connected to the bight portion of the U-shaped lever 19 and is disposed to overlie jaws 39 and 40 which clamp the model key in place. The free ends of lever 19 are pivotally connected to each leg 3*a* at 24.

A pressure exerted at 32, such as contact with support 35, causes the links 30 and 31 to spread, thereby raising base 4 and motor 5, the mobile frame not being capable of vertical movement. Support 35 is axially controllable and acts to exert pressure at 32 during the last few moments of the movement of frame 3 from right to left, causing the motor 5 to rise so that its axis occupies the position of line B—B to provide clearance for an operator to insert another blank key.

In addition, spacing links 20 and 21 are pivotally connected to lever 19 at their upper ends at 22 and to pivotal connection 23 at their lower ends at 34.

Since this invention will be more readily comprehended when in operation, a short description of same follows.

Figure 5:
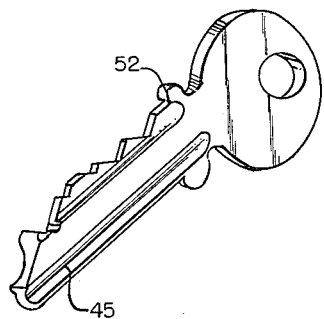
FIG. 5 is a perspective view of the Yale type of key which is to be duplicated.
Figure 6:
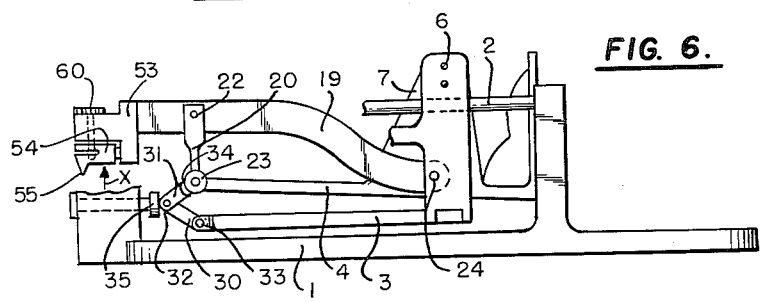
FIG. 6 is a fragmentary side elevation of the suspension system.

First a key to be duplicated or model key, such as the Yale key illustrated in FIG. 5 and having a longitudinal groove 45, is placed between jaws 39 and 40 with flange 39' of jaw 39 projecting into groove 45. The blank key is then placed between jaws 37, 38 in a similar manner with flange 44 in groove 45. Movable guides 50 and 51 on the head will engage the terminal notch 52 of the key to properly align the keys longitudinally.

Figure 1:
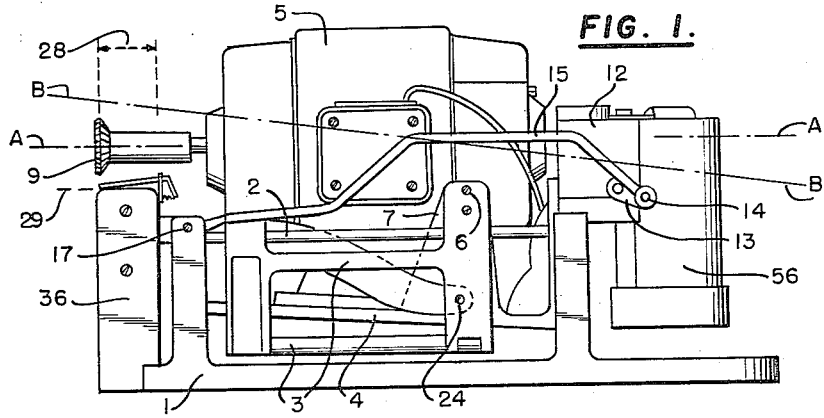
FIG 1 is a side elevation of a machine constructed in accordance with the present invention.
Figure 2:
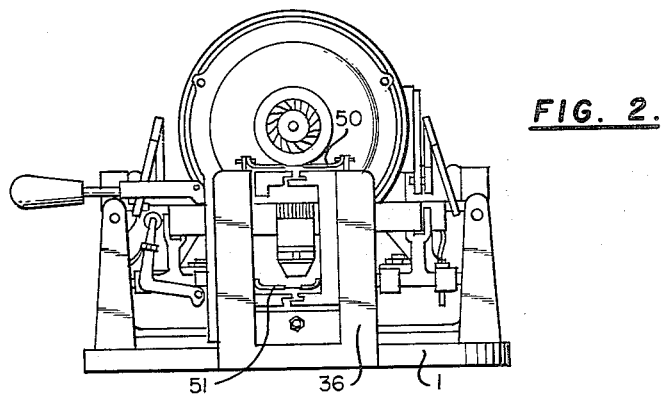
FIG. 2 is an end view as seen from the left of FIG. 1.
Figure 3:
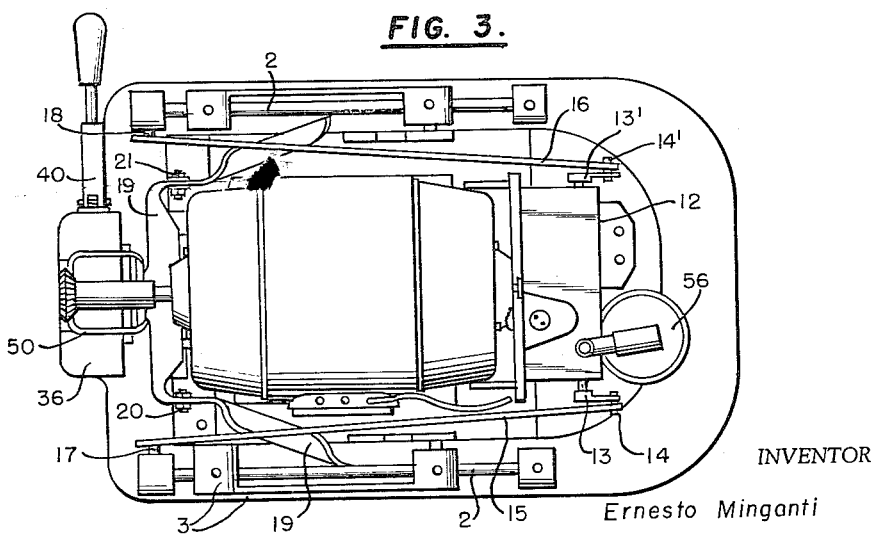
FIG. 3 is a plan view of the machine.

Care must be taken that when surface 55 engages the model key, milling wheel 9 engages the corresponding portion of the blank key and this alignment is assured by use of guides 50 and 51. Screw 60 may be turned to adjust surface 55 to the proper vertical height. Then a switch in the motor circuit is closed to start the motor 5. As is indicated in FIG. 1 the milling wheel 9 is resting elevated from the plane of the work 29 when the motor axis is disposed along line B—B. As links 30 and 31 move out of engagement with support 35, the motor axis is lowered until surface 55 engages the contour of the model key. This surface moves up and down, and by means of the suspension system the motor axis is moved to corresponding positions whereby the milling wheel 9 will cut a similar contour in the blank key. The weight of the system causes wheel 9 and surface 55 to act with a force X on lever 19.

Spacing links 20 and 21 are always disposed vertically so that the spacing between surface 55 and milling wheel 9 does not change regardless of the position of surface 55.

Thus the suspension system provides for both vertical and horizontal movement of surface 55 and milling wheel 9. When wheel 9 has moved distance 28 and is at the end of its course of travel, cam 25 engages switch actuator 27 to stop motor 5. To return the motor to its original position, a switch in the motor circuit is closed whereby the motor 5 will return to the position illustrated in FIG. 1. However, before the return cycle, a new blank key may be inserted so that a key may be cut both in the forward and return movement of the motor. Note that at the end of the forward movement the milling wheel 9 does not interfere with removal of a cut key and insertion of a blank key.

It will therefore be seen from the foregoing illustrated embodiment that the automatic key duplicating machine of the invention provides means for supporting the cutting wheel for bodily vertical movement together with a carriage for longitudinally moving said supporting means and wheel, and means for automatically reversing the movement of said carriage, in which the rotation of the cutting wheel as well as its longitudinal travel with respect to the key blank is effected by means of a single motor. Also, provision is made for removal of a cut key and insertion of a blank key without interference of the milling wheel 9.

It is a feature of the invention that the key duplicating machine as above characterized is comparatively simple in its construction, may be produced at reasonable cost, and will reliably function in practical operation.

The novel suspension system and mobile carriage unit are so constructed and arranged that movement of the carriage can be automatically reversed by providing a mechanical return mechanism of the type shown in U.S. Patent No. 2,148,668 if desired and that the action of the rotating milling cutter under control of index follower member 55 can be repeated.

It is a feature of the invention that at the end of the cutter movement the motor switch is opened to discontinue operation of the motor.

I claim:

In a duplicating machine, including a base having a head at one end thereof, retaining means consisting of upper and lower clamp assemblies, each assembly including a stationary jaw and a spring-biased movable jaw urged in clamping position towards the stationary jaw to hold the blank key and the model key on said head, milling means, a single motor for driving the milling means, a follower assembly means for moving the follower assembly over the model key and the milling means over the blank key; the improvement comprising a suspension system pivotally mounting the milling means and the follower assembly and synchronizing the vertical and horizontal movements of said milling means with that of the follower assembly passing over the contour of the model key, said suspension system including a mobile frame on each side of said base frame which is mounted for longitudinal movement therealong, a U-shaped lever pivotally mounted at each end of the rear portion of said mobile frame which has its arms about said single motor, said follower assembly being mounted on the bight portion of said U-shaped lever to overlap said clamping jaws, a motor base having upstanding legs on its rear portion which is pivotally connected to the upper rear portion of the mobile frame at the upper ends of said legs whereby the weight of the motor distributed by the mobile frame urges the follower down onto the contour of the model key and also urges the milling means downwardly onto the surface of the blank key, an upper link at each side of said mobile frame, one of said upper links being pivotally connected at one end to the forward portion of the base frame, a support slidably mounted in said head, the other of said upper links connected to said slidable support in said head whereby pressure is exerted by said support on movement of said frame from right to left, a lower link at each side of said mobile frame, each of said lower links being pivotally connected to the forward portion of said mobile frame and one of said lower links being connected to said slidable support in said head, an index follower mounted on said head for controlling the vertical cutting movement of said milling means, a spacing link on each side of said motor connected to opposite sides of said mobile frame, and each pivotally connected to the forward portion of the U-shaped lever, said spacing links being always disposed vertically and opposite said index follower whereby the milling means is maintained in vertically spaced relation to said slidable support in the head for mounting the keys, the longitudinal movement of said support with associated milling means being reversible and said motor and milling means being pivotally movable away from said keys, and a cam bar and jaw links for pivotal connection of said bar to move the jaw assembly to open and closed position.

References Cited in the file of this patent

UNITED STATES PATENTS 2,467,575    Stolove et al. _____ Apr. 19, 1949